Patented May 2, 1939

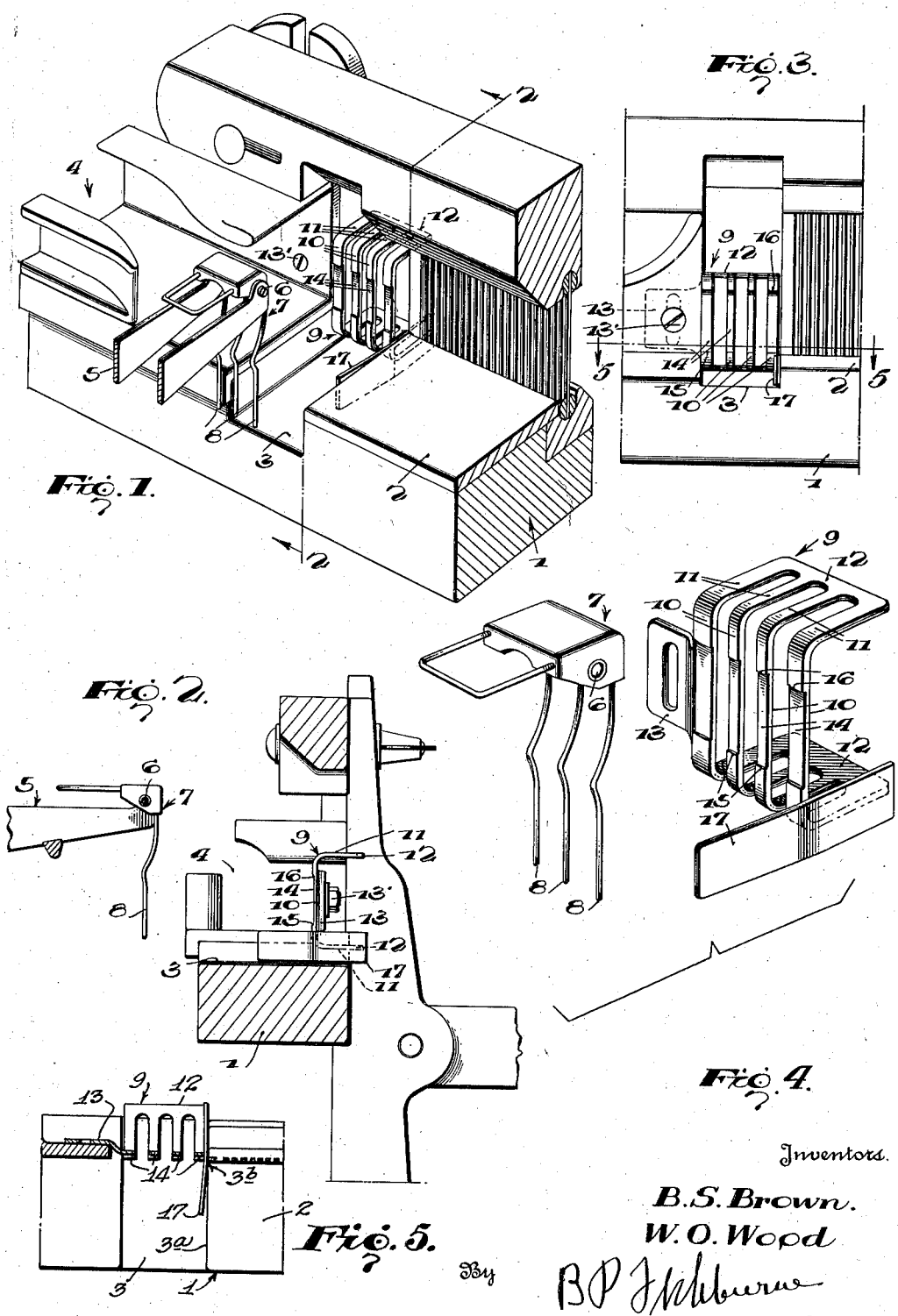

2,156,838

UNITED STATES PATENT OFFICE 2,156,838

FILLING DETECTING MECHANISM FOR LOOMS

Bennie S. Brown and William O. Wood, Greenwood, S. C.

Application January 13, 1938, Serial No. 184,878

3 Claims. (Cl. 139—372)

Our invention relates to filling-detecting mechanism for looms and also to the grid included in such mechanism.

An important object of the invention is to improve the construction of the grid, which is mounted upon the lay for eliminating the falling or passing of the intact filling below the lower end of the fork, when a slack occurs in the filling.

A further object of the invention is to provide filling-detecting mechanism of the above mentioned character which will effectively prevent the dropping of the intact filling below the grid, which frequently occurs when running narrow goods on a wide loom, resulting in making a stringy or shaggy selvage.

Other objects and advantages of the invention will be apparent during the course of the following description.

In the accompanying drawing forming a part of this application and in which like numerals are employed to designate like parts throughout the same, Figure 1 is a perspective view of a filling-detecting mechanism embodying my invention, showing the same applied to parts of a loom, Figure 2 is a transverse section taken on line 2—2 of Figure 1, Figure 3 is a front elevation of the grid embodying our invention, showing the same in place, Figure 4 is a perspective view of the grid removed, and, Figure 5 is a horizontal section taken on line 5—5 of Figure 3, In the drawing, wherein for the purpose of illustration is shown a preferred embodiment of our invention, the numeral 1 designates a lay having a shuttle-race 2, intersected by a transverse recess 3 for the passage of the tines of a fork. The numeral 4 designates a shuttle-box, partly shown in Figure 1. The numeral 5 designates the fork-slide, only the rear end thereof being shown in Figures 1 and 2. The construction thus shown and described is identical with that shown in the patent to E. S. Stimpson, 889,825, issued June 2, 1908.

Pivotally mounted upon the slide 5 as shown at 6, is a fork 7, having spaced tines 8.

Mounted to cooperate with the fork 7 is a grid 9, embodying the present invention. This grid comprises spaced vertical bars 10, provided at their upper and lower ends with horizontal extensions 11, connected by transverse bars 12. Preferably formed integral with one end bar 10 is an ear-lug 13, rigidly attached to the side wall of the shuttle-box 4 by screw 13' and thereby holding the grid in position. The grid is arranged within the rear end of the recess 3, and the tines 8 of the fork are in alignment with the spaces between the grid-bars, to enter these spaces, in the absence of intact filling.

The grid-bars 10 are provided upon their inner or front faces with recesses 14, which extend throughout the major portion of the length of the bars 10, affording shoulders 15 and 16, which are sufficient, under most conditions, for preventing the filling from improperly passing off of the ends of the bars 10. The numeral 17 designates a horizontal finger or strip, rigidly attached to the grid 9, at the outer side of one end bar 10. This finger is arranged within the recess 3 and has its upper surface preferably substantially flush with the bottom wall of the shuttle-race 2 but does not project above the same. The finger 17 extends beyond the front face of the grid 9 for a substantial distance and serves to prevent the filling, if considerable slack should occur, from passing beneath the grid 9 or about the rear corner of the recess 3. The bars 10 of the grid terminate substantially flush with the inner surface of the side wall of the shuttle-race, including the reeds A. This is the conventional arrangement for otherwise the shuttle would strike the grid. Figure 5 more clearly shows the conventional arrangement. As clearly shown in Figures 1 and 5, that portion of the finger 17 next to the grid is disposed in substantial contacting relation with the side wall 3a of the recess 3. The arm 7 is arranged so close to the side wall 3a of this recess 3, that the slack filling falling from the grid cannot pass between the arm and the side wall and be caught on the shoulder 3b of the side wall 3a.

Our improved filling-detecting mechanism or improved grid is adapted to be applied upon a loom of the type shown in Patent 889,825 or the looms of the type shown in Patent 913,196, or any other type of looms.

It is to be understood that the form of our invention herewith shown and described is to be taken as a preferred example of the same and that various changes in the shape, size and arrangement of parts, may be resorted to, without departing from the spirit of our invention or the scope of the subjoined claims.

Having thus described our invention, what we claim is:

1. A lay having a shuttle-race provided with a transverse recess, said recess having a side wall provided with a corner, a grid comprising spaced vertical bars, said grid being arranged within the recess adjacent to one side of the shuttle-race, and a substantially horizontal finger immovably attached to the lower end of the grid and extending forwardly beyond the same, that portion of the finger next to the grid being arranged in substantial contacting relation with the side wall of the recess adjacent to the said corner for preventing the filling which may fall from the grid being caught on said corner.

2. A grid to be mounted in a recess formed in the shuttle-race of the loom, the recess having a side wall having a corner, said grid comprising spaced vertical bars and substantially horizontal upper and lower ends, a horizontal finger rigidly attached to the lower horizontal end of the grid and extending forwardly beyond the grid, that portion of the finger next to the grid being straight and arranged for substantially contacting with the side wall of the recess adjacent to said corner, the finger being positioned so close to said side wall that the filling which may fall from the grid is prevented from being caught on said corner.

3. A grid to be mounted in a recess formed in the shuttle-race of the loom, the recess having a side wall having a corner, and a substantially horizontal finger arranged within the recess and near the lower end of the grid and extending forwardly beyond the grid, that portion of the finger next to the grid being arranged in substantial contacting relation with said side wall of the recess adjacent to said corner, the finger extending rearwardly beyond the corner, the finger serving to prevent the filling which may fall from the grid being cut on said corner.

BENNIE S. BROWN.
WILLIAM O. WOOD.